US011889778B2

(12) United States Patent
Viaene

(10) Patent No.: US 11,889,778 B2
(45) Date of Patent: Feb. 6, 2024

(54) RAKE ROTOR HEIGHT CONTROL

(71) Applicant: CNH Industrial America LLC, New Holland, PA (US)

(72) Inventor: Pieter W. Viaene, Ichtegem (BE)

(73) Assignee: CNH Industrial America LLC, New Holland, PA (US)

( * ) Notice: Subject to any disclaimer, the term of this patent is extended or adjusted under 35 U.S.C. 154(b) by 927 days.

(21) Appl. No.: 16/441,387

(22) Filed: Jun. 14, 2019

(65) Prior Publication Data

US 2019/0380254 A1 Dec. 19, 2019

(30) Foreign Application Priority Data

Jun. 15, 2018 (BE) .................................. 2018-5400

(51) Int. Cl.
*A01D 78/10* (2006.01)
*A01D 80/00* (2006.01)
(Continued)

(52) U.S. Cl.
CPC ........ *A01B 63/008* (2013.01); *A01D 78/1028* (2013.01); *A01D 80/00* (2013.01);
(Continued)

(58) Field of Classification Search
CPC .. A01D 78/00–78/20; A01D 41/127–41/1278; A01D 80/00–80/02
See application file for complete search history.

(56) References Cited

U.S. PATENT DOCUMENTS 4,720,962 A * 1/1988 Klinner ................ A01D 89/008
56/DIG. 15
8,393,137 B1 * 3/2013 Crosby .................. A01D 75/00
701/50
(Continued)

FOREIGN PATENT DOCUMENTS

AT 365 883 2/1982
DE 32 08 246 A1 9/1983
(Continued)

OTHER PUBLICATIONS

Belgium Office Action dated Feb. 14, 2019 for Belgium Application No. 201805400 (12 pages).
(Continued)

*Primary Examiner* — Adam J Behrens
*Assistant Examiner* — Madeline I Runco
(74) *Attorney, Agent, or Firm* — Rebecca L. Henkel; Rickard K. DeMille

(57) ABSTRACT

An agricultural implement including a frame, at least one rake moveably coupled to the frame and including a plurality of tine arms, a plurality of tines connected to the plurality of tine arms, and a rotor drive configured for rotating the plurality of tine arms, and an adjustment system configured for adjusting a rake height of the at least one rake. The adjustment system includes at least one actuator, an electronic control unit operably connected to the at least one actuator, and at least one dust sensor supported by the frame and operably connected to the electronic control unit. The at least one dust sensor monitors a dust level and communicates dust level data to the electronic control unit which correspondingly adjusts the rake height based upon the dust level data.

20 Claims, 4 Drawing Sheets

(51) Int. Cl.
*A01B 63/00* (2006.01)
*G01N 15/06* (2006.01)
*G01P 13/00* (2006.01)

(52) U.S. Cl.
CPC .......... *G01N 15/06* (2013.01); *G01P 13/0006* (2013.01); *A01D 78/1078* (2013.01); *G01N 2015/0693* (2013.01)

(56) References Cited

U.S. PATENT DOCUMENTS

| | | | |
|---|---|---|---|
| 9,807,938 B2 * | 11/2017 | Wilken | .................. G05B 17/02 |
| 9,973,710 B2 * | 5/2018 | Boydens | .................... G06T 7/70 |
| 10,264,730 B2 | 4/2019 | Wagner et al. | |
| 10,470,366 B2 * | 11/2019 | Mahieu | .............. A01D 41/1243 |
| 2002/0011056 A1 | 1/2002 | Lely et al. | |
| 2002/0014059 A1 | 2/2002 | Lely et al. | |
| 2012/0121343 A1 * | 5/2012 | Kerr | ....................... A01D 87/10 |
| | | | 406/152 |
| 2019/0329764 A1 * | 10/2019 | Matsuzaki | .............. G01S 15/93 |

FOREIGN PATENT DOCUMENTS

| | | | | |
|---|---|---|---|---|
| DE | 94 19 786.5 | | 2/1995 | |
| DE | 10 2005 005 556 A1 | | 8/2006 | |
| DE | 10 2005 005 557 A1 | | 8/2006 | |
| DE | 102005005557 A1 * | | 8/2006 | .......... A01B 79/005 |
| DE | 10 2010 010 861 A1 | | 9/2011 | |
| DE | 102013110558 A1 * | | 3/2015 | ......... A01D 78/1078 |
| DE | 10 2014 108 947 B4 | | 2/2016 | |
| DE | 102014108947 B4 * | | 2/2016 | .......... A01D 41/127 |
| DE | 10 2014 014 131 A1 | | 3/2016 | |
| EP | 0 383 120 A1 | | 8/1990 | |
| EP | 0 642 733 A1 | | 8/1994 | |
| EP | 0 954 956 A1 | | 11/1999 | |
| EP | 1 031 269 A1 | | 8/2000 | |
| EP | 1 125 491 A1 | | 8/2001 | |
| EP | 1 813 142 A1 | | 8/2007 | |
| EP | 2 272 312 A1 | | 1/2011 | |
| EP | 2 286 657 A2 | | 2/2011 | |
| EP | 2 436 251 A1 | | 4/2012 | |
| EP | 2 520 155 A1 | | 11/2012 | |
| EP | 2 850 934 A2 | | 3/2015 | |
| EP | 2850934 A2 * | | 3/2015 | ......... A01D 78/1078 |
| EP | 3 180 975 A1 | | 6/2017 | |
| EP | 3357323 A1 * | | 8/2018 | .......... A01D 78/125 |
| EP | 3639647 B1 * | | 4/2021 | ......... A01D 41/1243 |
| FR | 2 943 211 A1 | | 9/2010 | |
| FR | 3 025 974 A1 | | 3/2016 | |

OTHER PUBLICATIONS

"New ComfortKit Solution Gives Full Control over Your Vicon Rake", Vicon, Kverneland Group Kerteminde, Paris, France, Feb. 28, 2017 (3 pages).

"Harken met gps, Green omkijken meer naar wiers" Veehouderij Technieck, Jul. 2016 (1 page).

Extended European Search Report dated Sep. 23, 2019 for European Patent Application No. 19 17 9989 (5 pages).

* cited by examiner

RAKE ROTOR HEIGHT CONTROL

BACKGROUND OF THE INVENTION

1. Field of the Invention

The present invention relates to agricultural implements, and, more particularly, to agricultural rakes for gathering cut crop material into windrows.

2. Description of the Related Art

With respect to hay making, the crop material, such as hay or straw, must generally be cut and allowed to dry in the field before the crop material is bailed. Often, an agricultural implement known as an agricultural rake is used to gather the cut crop material into windrows in the field.

Generally, agricultural rakes can be in the form of rotary rakes or wheel rakes, which are pulled behind an agricultural vehicle. Agricultural rakes typically include a frame, ground-engaging wheels which support the frame, and multiple rotors or wheels with tines that collect the crop material. With respect to rotary rakes, the rotors are generally driven by a respective rotor drive about a substantially vertical rotor axis. Agricultural rakes may also include actuators for lifting a portion of the frame, and thereby the rakes, into and out of a working, field position and a transport position in which the rakes are elevated from the ground.

It is known to passively and/or actively control the height in order for the tines to follow the surface of the field. A passive height control method typically involves including a suspension system coupled to the ground-engaging wheels and/or a type of follower wheel connected to the frame which contacts the field in order to passively adjust the height of the rotors. An active height control method typically includes an adjustment system which raises or lowers the frame relative to the field according to data gathered by a height sensor. An adjustment system may include hydraulic cylinders for adjusting the position of the ground-engaging wheels in order to alter the height of the rotor. It is known to have a height measurement sensor in the form of an ultrasonic sensor. It is also known to use an ultrasonic sensor in conjunction with a pressure sensor for respectively measuring the geometry and density of the crop material and the load on the rake. It is further known to provide a vibration sensor that senses the vibration of the tines in order to automatically raise the height of the rotor. However, such prior art systems, due to a lack of accuracy and responsiveness, may still lead to an excess amount of particulate matter, such as dirt or dust, clods of dirt, stones, various other foreign objects, etc., within the windrows. As can be appreciated, the presence of dust in the collected crop material lowers the quality and decreases the value of the crop material.

What is needed in the art is a cost-effective and responsive adjustment system for an agricultural rake in order to minimize dust within the windrow.

SUMMARY OF THE INVENTION

The present invention provides an agricultural rake with an adjustment system for selectively adjusting the rake height of each rake. The adjustment system includes at least one height adjustment actuator, an electronic control unit, and one or more dust sensor(s) associated with each rake. The dust sensor(s) can indirectly measure the rake height by monitoring the dust level in a particular plane or zone which, if dust is present, can indicate that the rake is undesirably scraping or otherwise contacting the surface of the field.

The invention in one form is directed to an agricultural implement which includes a frame, at least one rake moveably coupled to the frame and including a plurality of tine arms, a plurality of tines connected to the plurality of tine arms, and a rotor drive configured for rotating the plurality of tine arms, and an adjustment system configured for adjusting a rake height of the at least one rake. The adjustment system includes at least one actuator connected to the frame and configured for adjusting the rake height and an electronic control unit operably connected to the at least one actuator. The adjustment system is characterized in that the adjustment system further includes at least one dust sensor supported by the frame and operably connected to the electronic control unit. The at least one dust sensor monitors a dust level and communicates dust level data to the electronic control unit which correspondingly adjusts the rake height based upon the dust level data.

The invention in another form is directed to an adjustment system configured for adjusting a rake height for a rake of an agricultural implement. The adjustment system includes at least one actuator configured for adjusting the rake height, an electronic control unit operably connected to the at least one actuator, and at least one dust sensor operably connected to the electronic control unit. The at least one dust sensor monitoring a dust level and communicating dust level data to the electronic control unit which correspondingly adjusts the rake height based upon the dust level data.

The invention in another form is directed to a method for operating an agricultural implement. The agricultural implement includes a frame, at least one rake moveably coupled to the frame and including a plurality of tine arms, a plurality of tines connected to the plurality of tine arms, and a rotor drive configured for rotating the plurality of tine arms. The method includes the steps of providing an adjustment system configured for adjusting a rake height of the at least one rake. The adjustment system includes at least one actuator configured for connecting to the frame and adjusting the rake height, an electronic control unit operably connected to the at least one actuator, and at least one dust sensor configured for being supported by the frame and the at least one dust sensor is operably connected to the electronic control unit. The method includes the further steps of indirectly monitoring, by the at least one dust sensor, the rake height by monitoring a dust level, communicating, by the at least one dust sensor, dust level data to the electronic control unit, and adjusting the rake height, by the electronic control unit, based upon the dust level data and upon determining that the dust level is one of above and below a predetermined threshold value.

An advantage of the present invention is that the rake height can be indirectly monitored by measuring the level of particulate matter present, such as dust, in order to readily and accurately adjust the rake height of each rake individually and/or of the entire agricultural implement.

Another advantage of the present invention is that the quality of the crop material harvested may be increased because less dust is included into the windrows of crop material due to the responsiveness of actively altering the height via monitoring the dust level.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
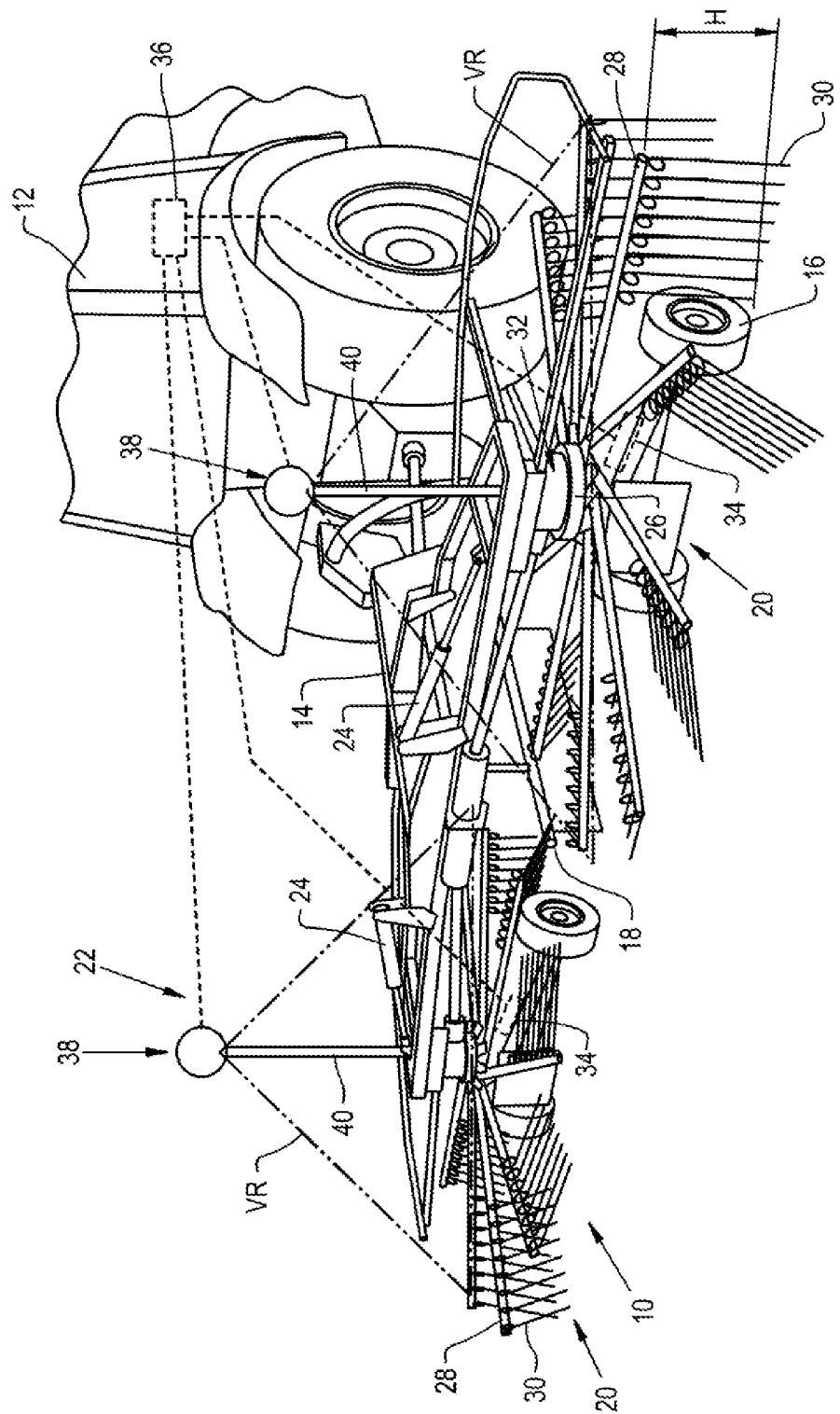
FIG. 1 is a perspective view of an embodiment of an implement including an adjustment system with dust sensors in the form of cameras according to the present invention.

Referring now to the drawings, and more particularly to FIG. 1, there is shown an agricultural implement 10 which is pulled behind an agricultural vehicle 12, such as an agricultural tractor 12. The agricultural implement 10 may be in the form of an agricultural rotary rake 10, which may be used for gathering cut hay or straw into windrows. However, the agricultural implement 10 may be in the form of any desired agricultural implement which collects cut crop material, such as an agricultural wheel rake. The agricultural implement 10 generally includes a frame 14, ground-engaging wheels 16 which support the frame 14, a swath board 18, at least one rake 20, and an adjustment system 22 which is configured for adjusting a rake height H of the rake(s) 20.

The frame 14 typically has a main body, extending longitudinally in the direction of travel of the agricultural vehicle 12, and rake connecting arms that are pivotally attached to the main body of the frame 14. In a known manner, the agricultural implement 10 may be equipped with actuators 24 that pivot the rakes 20 into and out of a working position, as shown in FIG. 1, and a transportation position in which the rakes 20 are lifted off the ground.

The one or more rake(s) 20 may be in the form of rotary rakes 20 which rotate about a substantially vertical axis. As shown in the present embodiment, the agricultural implement 10 includes a pair of rakes 20. Each rake 20 is moveably coupled to the frame 14 and includes a hub 26, tine arms 28 attached to and extending tangentially from the hub 26, tines 30 connected to the tine arms 28 and contacting the crop material, and a rotor drive 32, e.g. a hydraulic motor, configured for rotating the tine arms 28. The wheels 16 respectively support each rake 20 at the defined, rake height H above the field. It should be appreciated that the rake height H is determinative of whether the tines contact the field and thereby agitate the field causing the windrow of crop material to be contaminated with an excess amount particulate matter, such as dirt or dust, clods of dirt, stones, various other foreign objects, etc.

The adjustment system 22 generally includes at least one actuator 34 for adjusting the rake height H, a controller 36 operably connected to the actuator(s) 34, and at least one dust sensor 38 that is supported by the frame 14 and operably connected to the controller 36.

The actuator(s) 34 can be connected to the frame 14 and/or to the wheels 16. The actuator(s) 34 may individually and selectively adjust the vertical, rake height H of each rake 20. The actuators 34 may be in the form of known hydraulic or electric cylinders that adjust the position of the wheels 16 and thereby raise or lower the rake 20 in a known manner.

The controller 36 is operably coupled to dust sensors 38 and the actuators 34 via a wired or wireless connection. The controller 36 receives sensor data from the dust sensors 38 and sends control commands to the actuators 34 in order to raise or lower each rake 20 based upon whether the tines 30 of a respective rake 20 are undesirably contacting the field or are lifted too far above the field. For instance, the dust sensors 38 will monitor the amount of dust, or lack thereof, and will register an excess amount of dust when the tines 30 undesirably contact the field, causing an excess amount of particulate matter, such as dust, to enter the windrows. Then the controller 36 will selectively and individually lift the rakes 20 upon receiving the dust level data from the dust sensors 38.

The controller 36 may be in the form of any desired electronic control unit (ECU), and the controller 36 may be incorporated into existing hardware and/or software of the agricultural vehicle 12 or into the agricultural implement 10. The controller 36 may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the controller 36 described herein may be implemented in software code or instructions which are tangibly stored on the tangible computer readable medium. Upon loading and executing such software code or instructions by the controller 36, the controller 36 may perform any of the functionality described herein. Hence, the controller 36 may be preloaded with dust level data, for example a preset dust level threshold value, or an operator may manually input a preset value or range regarding the acceptable dust level(s).

The one or more dust sensor(s) 38, associated with each rake 20, monitor a dust level suspended in the air and communicate dust level data to the controller 36, which then correspondingly adjusts the rake height H based upon the dust level data. Each sensor 38 may be located vertically above the tine arms 28. Thereby, the dust sensors 38 indirectly monitor the rake height H by monitoring the dust level. The adjustment system 22 may also include an elongated mount 40 that mounts each dust sensor 38 vertically above the tine arms 28. In more detail, each elongated mount 40 is connected to the frame 14 or the top of the rake 20 such that each dust sensor 38 is centrally mounted above the tine arms 28. As shown in the present embodiment, each dust sensor 38 is in the form of a camera 38. The camera 38 may monitor a displacement of crop material and/or a displacement of dust, or lack thereof, by capturing image data of each rake 20. As shown, the cameras 38 have a respective viewing range VR, which allows each camera 38 to monitor at least a portion of an upper zone of each rake 20. The upper zone as used herein refers to the zone at least partially above and below the tine arms 28 such that the camera 38 can view the crop material being collected by the tines 30 as well as an area above the tine arms 28. Each camera 38 provides dust level data in the form of image data, for example video and/or photographic data, of the upper zone and communicates this image data to the controller 36. In an alternative embodiment, the cameras 38 may be mounted at another location, such as to the main body of the frame 14. Further, it should be appreciated that the cameras 38 may be stationary or may rotate in conjunction with the rotary movement of each rake 20.

In the embodiment with cameras 38, the controller 36 may conduct image processing to quantify the amount or volume of crop material that is being displaced and/or dust that is being displaced. Also, the controller 36 can determine if heavier particulate matter is being displaced. For instance, the controller 36 can determine if a clod of dirt has been displaced since the trajectory of the clod of dirt will diverge from the trajectory of the crop material being collected.

Figure 2:
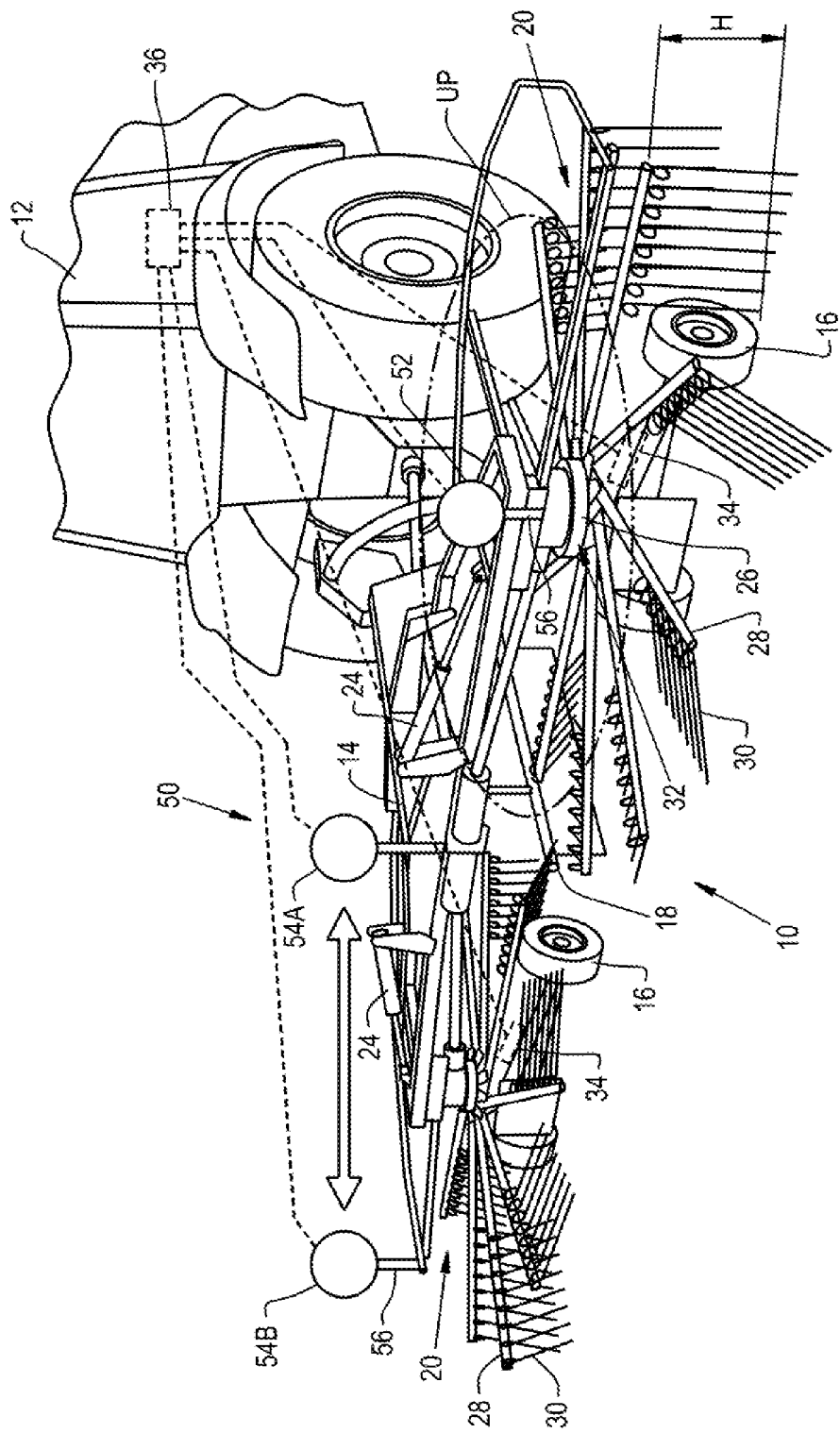
FIG. 2 is a perspective view of another embodiment of an adjustment system which includes optical sensors.

Referring now to FIG. 2, there is shown another embodiment of an adjustment system 50 with dust sensors 52 in the form of optical sensors 52. The adjustment system 50 can be substantially similar to the adjustment system 22 except that the adjustment system 50 includes one or more dust sensor(s) 52 in the form of optical sensors 52 instead of cameras 38. Thereby, like components have been identified with like reference characters.

The optical sensors 52 provide dust level data, which can be in the form of a dust level signal, to the controller 36 such that the controller 36 adjusts a respective actuator 34 in order to raise or lower the rake 20 based upon the dust level data. The optical sensors 52 may be mounted vertically above tine arms 28, and thereby the optical sensors 52 monitor a respective upper plane UP of each rake 20 in order to monitor the dust level suspended in the air. The upper plane UP may encompass a plane or an area above the tine arms 28. When the tines 30 undesirably contact the field and an excess amount of dust is correspondingly released into the air this excess dust can be registered by the optical sensors 52. It should be appreciated that a field may always have some level of dust present; however, the sensors 52 can monitor a portion of the rake 20 which is a plane or a range of space where the excess amount of dust is known to infiltrate when the tines 30 undesirably contact the field. Thus, when dust is present in the upper plane UP, it is indicative of a condition in which the tines 30 are undesirably contacting the ground and the rake 20 should then be raised. Each optical sensor 52 measures an amount of light present such that when dust is present in the upper plane UP, the amount of light detected will decrease. Upon the optical sensors 52 sending the dust level data, e.g. a threshold opacity level, to the controller 36, the controller 36 will then determine an amount of dust present above the tine arms 28. Thus, the amount of dust present above each rake 20 individually and/or above the overall implement 10 may be determined.

Each optical sensor 52 may be centrally mounted onto the frame 14 or onto the rake 20. Each optical sensor 52 can be stationary or mounted to the rake 20 such that the optical sensor 52 rotates in conjunction with the rotary movement of the rake 20. Each optical sensor 52 may be in the form of a self-contained sender and receiver optical sensor 52 or may be in the form of two separate sensors 54A, 54B which are respectively a first, sender optical sensor 54A and a second, receiver optical sensor 54B. The sender optical sensor 54A can be mounted to the main section of the frame 14 and the receiver optical sensor 54B can be mounted to an outer portion of the frame 14, or vice versa. In other words, the sender optical sensor 54A can be mounted adjacent to a central portion of the frame 14 and the receiver optical sensor 54B can be mounted adjacent to an end of a respective tine arm 28. By measuring the amount of light which is received by the receiver optical sensor 54B, the amount of dust present in between the optical sensors 54A, 54B may be determined by the controller 36. The adjustment system 50 may also include elongated mounts 56 in order to mount one or more of the optical sensors 52, 54A, 54B onto the frame 14 and above the rake 20.

It should be appreciated that the optical sensors 52, 54A, 54B may be in the form of visual light sensors or infrared sensors. In another alternative embodiment, the sensors 52, 54A, 54B may communicate using any desired frequency, including but not limited to radio waves.

Figure 3:
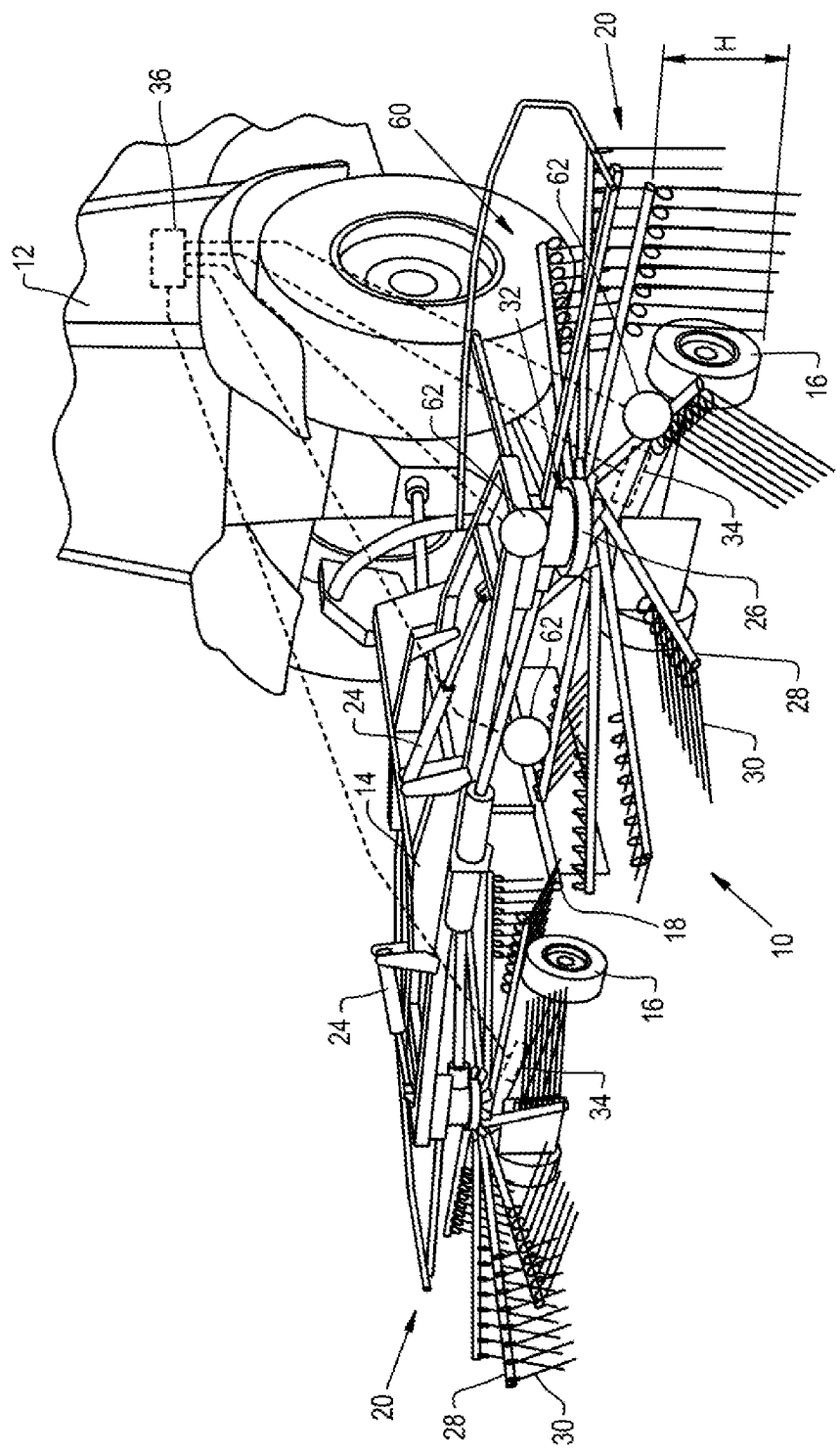
FIG. 3 is a perspective view of another embodiment of an adjustment system including vibration sensors.

Referring now to FIG. 3, there is shown another embodiment of an adjustment system 60 with one or more vibration sensor(s) 62 which are operably connected to the controller 36. The adjustment system 60 can be substantially similar to the adjustment system 22 except that the adjustment system 60 includes the vibrations sensors 62. Thereby, like components have been identified with like reference characters. For simplicity of description, the vibration sensors 62 were only shown on one rake 20; however, the vibration sensors 62 can be included on each rake 20.

The vibration sensors 62 may be connected to rake 20 at any desired location. For instance, the vibration sensors 62 may be connected to the swath board 18, the shaft of the rotor drive 32, the tine arms 28, and/or the tines 30. When one or more vibration sensor(s) 62 are connected to the swath board 18, the vibration sensor(s) 62 can measure when a particulate matter, e.g. a clod of dirt, forcibly hits the swath board 18. Hence, when an excessive amount of vibration is registered at the swath board 18, it is indicative of the tines 30 undesirably scraping the field, and thereby the controller 36 will raise the respective rake 20. Additionally or alternatively, when one or more vibration sensor(s) 62 are coupled to the tine arms 28 and/or the tines 30 themselves, the vibration sensor(s) 62 can measure the amount of vibration occurring on each rake 20 as the rotor drive 32 rotates the tine arms 28. Thereby, the vibration sensor(s) 62 can determine when the tines 30 undesirably contact the ground by way of the sensed excessive amount of vibration. The vibration sensors 62 can be in the form of any desired sensor which measures the vibration of the agricultural implement 10 and/or the rake 20.

Figure 4:
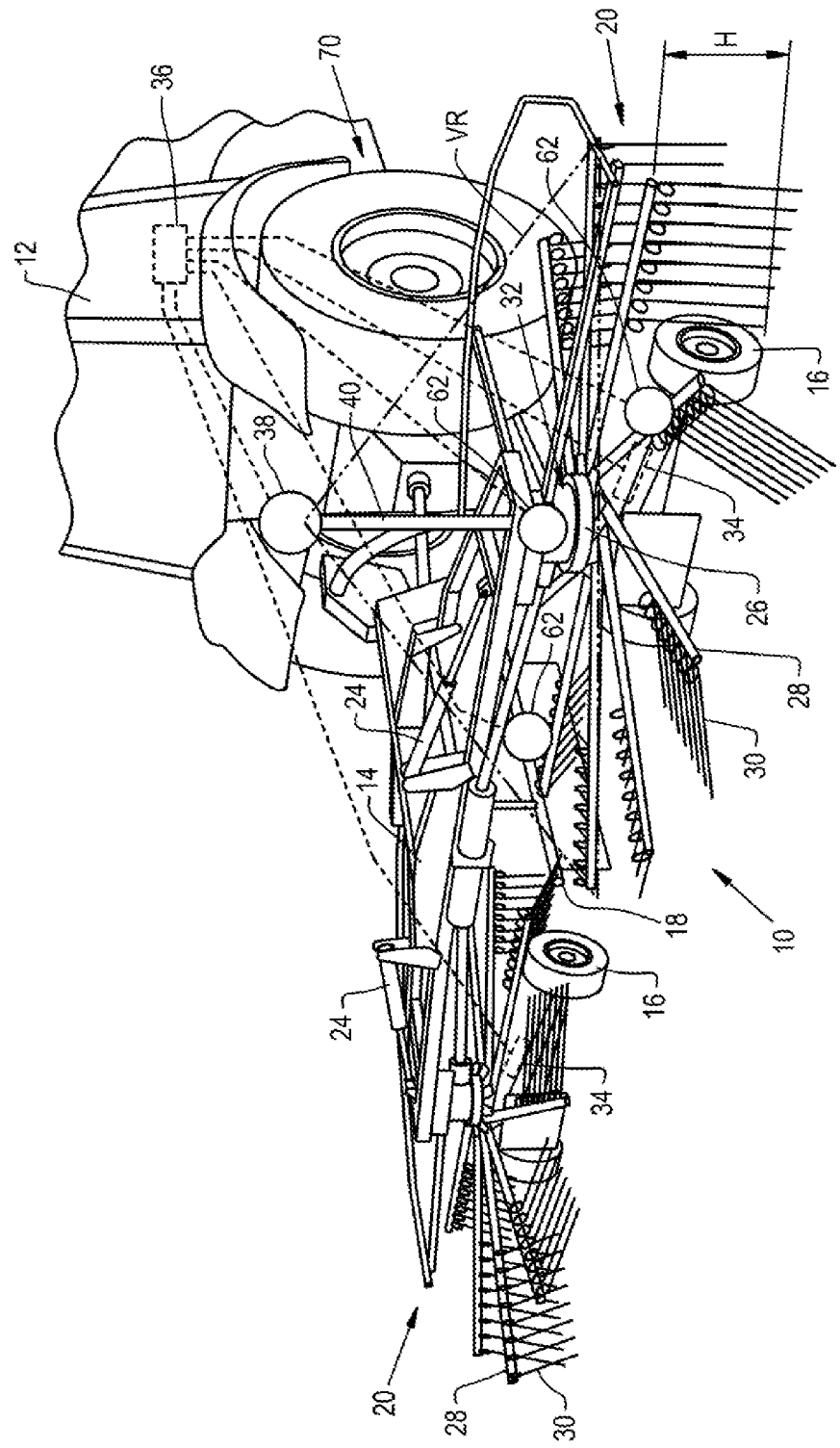
FIG. 4 is a perspective view of another embodiment of an adjustment system including dust sensors in the form of cameras as well as vibration sensors.

Referring now to FIG. 4, there is shown another embodiment of an adjustment system 70 which may include one or more dust sensor(s) 38 and/or 52, 54A, 54B (not shown) and one or more vibration sensor(s) 62, as discussed above. The adjustment system 70 can be substantially similar to the adjustment system 22 except that the adjustment system 70 includes the dust sensors 38 and/or 52, 54A, 54B (not shown) and vibrations sensors 62. Thereby, like components have been identified with like reference characters. In the present embodiment, the adjustment system 70 includes a camera 38 connected to the frame 14 and located above each rake 20. For simplicity of description, the camera 38 and vibration sensors 62 were only shown on one rake 20; however, each rake 20 may include cameras 38 and dust sensors 38. Therefore, the controller 36 may adjust the rake height H based upon the current dust level and the vibration experienced by the agricultural implement 10 and/or each rake 20.

It should be appreciated that the agricultural implement 10 may additionally include various other sensors such as a humidity sensor, a speed sensor for the agricultural vehicle 12 and/or the rotational speed of the rake 20, a GPS module, a crop material density sensor, etc. Further, an operator may input certain information into the controller 36, such as the crop material type, soil condition, swath dimensions, etc., which the controller 36 then incorporates into its analysis of the dust level data. It should also be appreciated that the controller 36 may automatically adjust the rake height H, for example on a dust level which is incorporated in the controller 36 and in combination with the entered information by the operator, will result in a specific dust level for these specific parameters. Further, an operator may even set a certain dust level and the controller 36 may automatically adjust the rake height H on the basis of this dust level as entered by the operator via a user interface. Also, for example, the controller 36 may automatically set and maintain a desired or optimal rake height H via using predetermined dust level tolerances, e.g. a predetermined threshold value; and thereby, the controller 36 may maintain the desired rake height H by raising the at least one rake 20, lowering the at least one rake 20, and/or maintaining the desired rake height (H) of the at least one rake 20 upon determining that the dust level is above, below, and/or at the predetermined threshold value. Alternatively, the operator may manually control the actuators 34 to adjust the rake height H. Additionally, the controller 36 may communicate a signal to the operator, via a user interface or indicator light, such that the operator may then decide whether to raise, lower, or keep the rake 20 at its current rake height H.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
   a frame;
   at least one rake moveably coupled to the frame and comprising a plurality of tine arms, a plurality of tines connected to the plurality of tine arms, and a rotor drive configured to rotate the plurality of tine arms; and
   an adjustment system configured to adjust a rake height of the at least one rake, the adjustment system comprising:
      at least one actuator connected to the frame and configured to adjust the rake height;
      an electronic control unit operably connected to the at least one actuator; and
      at least one dust sensor supported by the frame and operably connected to the electronic control unit, wherein the at least one dust sensor is configured to monitor a dust level and communicate dust level data to the electronic control unit, and the electronic control unit is configured to correspondingly adjust the rake height based upon the dust level data.

2. The agricultural implement of claim 1, wherein the at least one dust sensor is configured to indirectly monitor the rake height by monitoring the dust level to enable the electronic control unit to one of raise or lower the at least one rake upon determining that the dust level is one of above or below a predetermined threshold value.

3. The agricultural implement of claim 2, wherein the adjustment system further includes an elongated mount that mounts the at least one dust sensor vertically above the plurality of tine arms of the at least one rake.

4. The agricultural implement of claim 1, wherein the electronic control unit is configured to automatically set and maintain a desired rake height by at least one of raising the at least one rake, lowering the at least one rake, or maintaining the desired rake height upon determining that the dust level is one of above, below, or at a predetermined threshold value.

5. The agricultural implement of claim 2, wherein the at least one dust sensor is in the form of at least one optical sensor that is configured to provide a dust level signal to the electronic control unit to enable the electronic control unit to adjust the at least one actuator based upon the dust level signal.

6. The agricultural implement of claim 5, wherein the at least one optical sensor is in the form of a first optical sensor and a second optical sensor in communication with the first optical sensor, the first optical sensor is mounted adjacent to a central portion of the frame, and the second optical sensor is mounted adjacent to an end of a respective tine arm of the plurality of tine arms of the at least one rake.

7. The agricultural implement of claim 1, wherein the adjustment system further includes at least one sensor supported by the frame and operably coupled to the electronic control unit.

8. The agricultural implement of claim 7, wherein the at least one sensor is in the form of at least one vibration sensor.

9. The agricultural implement of claim 8, wherein the at least one vibration sensor is connected to one of the rotor drive, a tine arm of the plurality of tine arms, or a tine of the plurality of tines.

10. The agricultural implement of claim 8, further comprising a swath board, and the at least one vibration sensor is connected to the swath board to enable the at least one vibration sensor to monitor a vibration of the swath board.

11. The agricultural implement of claim 7, wherein the at least one sensor is one of a humidity sensor, a vehicle speed sensor, a rotational speed sensor for the at least one rake, a GPS module, or a crop material density sensor.

12. An adjustment system configured to adjust a rake height for a rake of an agricultural implement, the adjustment system comprising:
   at least one actuator configured to adjust the rake height;
   an electronic control unit operably connected to the at least one actuator; and
   at least one dust sensor operably connected to the electronic control unit, wherein the at least one dust sensor is configured to monitor a dust level and communicate dust level data to the electronic control unit, and the electronic control unit is configured to correspondingly adjust the rake height based upon the dust level data.

13. The adjustment system of claim 12, wherein the at least one dust sensor is configured to indirectly monitor the rake height by monitoring the dust level to enable the electronic control unit to one of raise or lower the rake upon determining that the dust level is one of above or below a predetermined threshold value.

14. The adjustment system of claim 12, wherein the at least one dust sensor is in the form of at least one optical sensor that is configured to provide a dust level signal to the electronic control unit to enable the electronic control unit to adjust the at least one actuator based upon the dust level signal.

15. The adjustment system of claim 12, further comprising at least one vibration sensor supported by a frame and operably coupled to the electronic control unit.

16. A method for operating an agricultural implement comprising the steps of:
- indirectly monitoring, by at least one dust sensor, a rake height by monitoring a dust level;
- communicating, by the at least one dust sensor, dust level data to an electronic control unit; and
- adjusting the rake height, by the electronic control unit, based upon the dust level data and upon determining that the dust level is one of above or below a predetermined threshold value.

17. The agricultural implement of claim 1, wherein the at least one dust sensor is mounted centrally above the at least one rake, the at least one dust sensor is configured to monitor at least a portion of an upper zone of the at least one rake to enable the at least one dust sensor to provide dust level data in the form of image data of the upper zone and communicate the image data to the electronic control unit, and the electronic control unit is configured to process the image data and determine a volume of at least one of the crop material or dust.

18. The agricultural implement of claim 5, wherein the at least one optical sensor is mounted above the plurality of tine arms and configured to monitor an upper plane of the at least one rake to enable the electronic control unit to determine an amount of dust present above the plurality of tine arms.

19. The agricultural implement of claim 1, wherein the electronic control unit is configured to:
- determine the dust level exceeds a threshold dust level; and
- increase the rake height in response to determining that the dust level exceeds the threshold dust level.

20. The agricultural implement of claim 12, wherein the electronic control unit is configured to:
- determine the dust level exceeds a threshold dust level; and
- increase the rake height in response to determining that the dust level exceeds the threshold dust level.

\* \* \* \* \*